Figure 1:
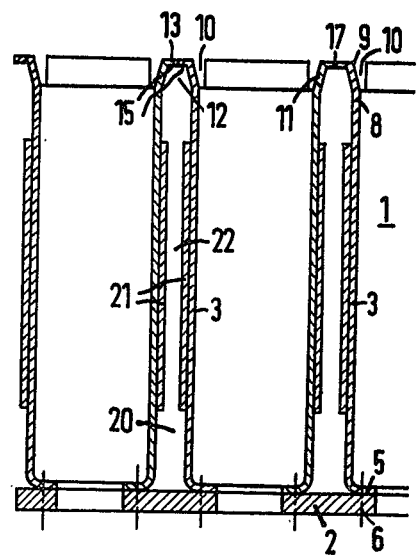

United States Patent [19]

Weber

[11] 4,243,889
[45] Jan. 6, 1981

[54] STORAGE RACK FOR ELONGATED FUEL ASSEMBLIES

[75] Inventor: Robert Weber, Uttenreuth, Fed. Rep. of Germany

[73] Assignee: Kraftwerk Union AG, Mulheim an der Ruhr, Fed. Rep. of Germany

[21] Appl. No.: 963,230

[22] Filed: Nov. 24, 1978

[30] Foreign Application Priority Data

Nov. 30, 1977 [DE] Fed. Rep. of Germany ....... 2753468

[51] Int. Cl.² ............................................. G21F 5/00
[52] U.S. Cl. .................................... 250/507; 250/518
[58] Field of Search ............................... 250/507, 518

[56] References Cited

U.S. PATENT DOCUMENTS

| | | | |
|---|---|---|---|
| 4,039,842 | 8/1977 | Mollon | 250/518 |
| 4,044,267 | 8/1977 | Bevilacqua | 250/518 |
| 4,096,392 | 6/1978 | Rubinstein | 250/507 |

*Primary Examiner*—Harold A. Dixon

*Attorney, Agent, or Firm*—Herbert L. Lerner

[57] ABSTRACT

Storage rack for elongated nuclear reactor-fuel assemblies having a polygonal cross section including an array of elongated sheetmetal shells of corresponding polygonal cross sections for receiving respective fuel assemblies therein at locations of the rack at which the fuel assemblies are to be positioned, the shells being spaced from one another and neutron-absorbing material of given thickness being disposed in the space therebetween, mutually adjacent shells of the array being connected to one another by a weld at respective upper edges thereof, the space between the shells being greater than the given thickness of the neutron-absorbing material and being bridged at the weld connection, for the most part, by sheetmetal extending transversely to the longitudinal direction of the shells, and means defining inlet openings to the spaces between the shells for providing access to the spaces of medium for cooling the fuel assemblies.

4 Claims, 2 Drawing Figures

STORAGE RACK FOR ELONGATED FUEL ASSEMBLIES

The invention relates to a storage rack for elongated fuel assemblies with polygonal cross section for nuclear reactors, such as light-water reactors, especially, wherein, for each fuel assembly position, a shell formed of sheet metal for receiving the respective fuel assembly therein is provided, and neutron-absorbing material is disposed in the space between respective adjacent shells, the respective adjacent shells having upper edges that are connected together by a weld.

In a storage arrangement known from German Published Non-Prosecuted Application DE-OS 23 61 363, the weld serves to enclose water-tightly absorber material provided between adjacent shells, so that the absorber material cannot be dissolved or corroded by the water. The welded seam is provided over the entire periphery of these shells which have straight surfaces along the entire length thereof and have a square cross section. At the outside of the rack, in this German publication, where no adjacent shells are present for defining a gap containing the absorber material, a tight closure is supposed to be attained by means of metal cover sheets. This tight closure, however, can be produced only at great expense.

It is an object of the invention to provide a storage rack of the foregoing type, the manner of operation, manufacture and operational safety or reliability of which are much improved over those of the heretofore known racks.

With the foregoing and other objects in view, there is provided, in accordance with the invention, a storage rack for elongated nuclear reactor-fuel assemblies having a polygonal cross section comprising an array of elongated sheetmetal shells of corresponding polygonal cross section for receiving respective fuel assemblies therein at locations of the rack at which the fuel assemblies are to be positioned, the shells being spaced from one another and neutron-absorbing material of given thickness being disposed in the space therebetween, mutually adjacent shells of the array being connected to one another by a weld at respective upper edges thereof, the space between the shells being greater than the given thickness of the neutron-absorbing material and being bridged at the weld connection, for the most part, by sheetmetal extending transversely to the longitudinal direction of the shells, and means defining inlet openings to the spaces between shells for providing access to the spaces of medium for cooling the fuel assemblies.

In the storage rack according to the invention, provision of a tight enclosure of the absorber material is dispensed with. This means that absorber materials such as, for example, boron steel, boron glass or the like are used which are not attacked by the coolant provided for the fuel assemblies. Improved manufacture is thereby achieved. In addition, the absorber effect can be improved further due to the fact that the coolant acts as a moderator. Thus, as is well known, light water, which is conventionally used as coolant of light-water reactors, reduces the velocity of fast neutrons, so that they can be absorbed efficiently, as so-called thermal neutrons, by commonly used absorber materials.

A further important advantage afforded by the invention of the instant application is that the sheetmetal which is provided between mutually adjacent shells and extends transversely to the longitudinal direction of the shells or the fuel assemblies received therein, increases the mobility of the shells relative to one another. Varying thermal expansions can thereby be compensated for or equalized if, for example an unoccupied shell is located adjacent a shell occupied by a fuel assembly which becomes considerably hotter than the unoccupied shell.

In accordance with another feature of the invention, the inlet openings are formed of cutouts in corners of the polygonal cross sections of the shells, the shells having marginal portions at the cutouts that are shorter in direction toward the polygonal cross section of the respective shells than in direction along the length of an edge of the polygonal cross section, the marginal portions being bent transversely to the axis of the respective shells in directions away from the interior of the shells, the marginal portions being formed with the respective upper edges, and the respective edges of the bent marginal portions of mutually adjacent shells being connected to one another by the weld. Between the corners of adjacent shells, cut-outs are provided which can improve the cooling action and, in particular, promote the flexibility of the shells and, thereby, the possibility of effecting length equalization. Mechanical stresses are thereby considerably reduced. The welded seams can be formed more simply and the shells can be made of thinner sheetmetal. In particular, there is no danger that, if the expansions should vary, the shells may warp and consequently impede the movement of installed fuel assemblies or even damage the fuel assemblies.

In accordance with a further feature of the invention, the bent marginal portions, respectively, have a length that is at least three times the thickness of the sheetmetal of the shells, so that the desired mobility for equalization of different thermal expansions is provided.

Normally, 5 to 10 times the thickness of the sheetmetal will be selected as the order of magnitude for the length of the bent martinal portions.

In accordance with an added feature of the invention, the bent marginal portions of a respective shell form an inlet funnel. To this end, part of the bent marginal portions can be formed as a rectilinear wedge surface. However, a bending radius of such great length may also be selected that the entire lateral projection overhang is formed by a circular arc. Intermediate shapes between the foregoing two shapes are also conceivable i.e. curves between a circular arc and a straight line.

In accordance with a concomitant feature of the invention, the marginal portions of mutually adjacent shells connected together by the weld are formed with guide means for centering a fuel assembly-transporting device. The fact that the mutually adjacent shells which are welded to one another have adequate strength overall also in the bent region is thereby utilized. In the simplest case, bore holes in which centering pins or mandrels of the loading device engage can serve as the guide means. In an obvious kinematic reversal, however, the use of pins or wedges, that are located on the marginal portions, for the purpose of centering is also readily conceivable.

Other features which are considered as characteristic for the invention are set forth in the appended claims.

Although the invention is illustrated and described herein as embodied in a storage rack for elongated fuel assemblies, it is nevertheless not intended to be limited to the details shown, since various modifications and structural changes may be made therein without departing from the spirit of the invention and within the scope and range of equivalents of the claims.

Figure 2:
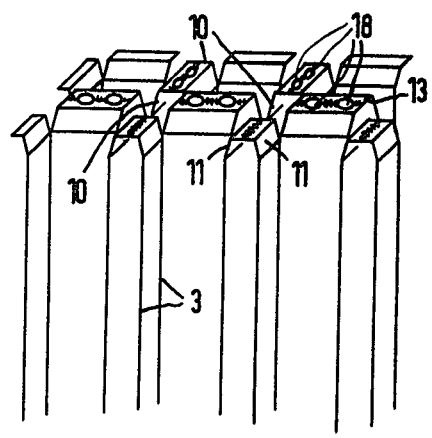

The construction and method of operation of the invention, however, together with additional objects and advantages thereof will be best understood from the following description of specific embodiments when read in connection with the accompanying drawings, in which:

FIG. 1 is a longitudinal sectional view of a storage rack for the fuel assemblies of a pressurized-water power reactor constructed in accordance with the invention; and FIG. 2 is a fragmentary perspective view of FIG. 1.

The longitudinal dimensions in the figures are shown distorted, since fuel assemblies, as is generally known, have a length of about 4 m or more, while the length of one of the sides of the square cross section thereof i.e. the width of the fuel assembly, is about 250 mm.

Referring now more specifically to the figures of the drawing, the fuel assembly rack, identified as a whole by 1, has a base plate 2, which serves primarily as a support element for individual casings or shells 3 which are associated with the fuel assembly positions. The shells 3 have a square cross section matching that of the fuel assemblies and so as to accommodate the latter therein. For this purpose, the shells 3 can be formed of U-shaped or equal-sided right-angle profiled sheet metal parts that are welded together.

Each shell 3 is provided at the lower end thereof, as viewed in FIG. 1, with tabs 5 bent inwardly i.e. towards the fuel assembly that would be received within the respective shell 3. The tabs 5 are fastened to the bottom plate 2 by screw connections diagrammatically indicated at 6.

At the upper end 8, as viewed in the figures, the shells 3 are provided with cutouts 10 in the vicinity of the corners 9 thereof; marginal portions 11 are produced, the lengths of which in the direction of the fuel-assembly cross section are shorter than the length of the sides of the square cross section of the shells 3 shrouds. The size of the cutouts 10 can be determined in accordance with the accuracy with which the corners of the shells 3 are produced. With a view to easy production yet providing adequate strength, the length of the marginal portions 11 is selected to be from 10 to 30 mm shorter than the length of the sides of the polygonal cross section.

As shown especially in FIG. 1, the marginal portions 11 are bent away from the interior of the respective shell 1 wherein a fuel assembly is to be positioned. In the illustrated embodiment of the invention, a wedge-shaped region 12 and a region 13 bent perpendicularly to the longitudinal axis of the respective shells 3 are produced thereby. The length of the regions 13 is 10 mm, for example, and thus approximately three times the sheetmetal thickness of 3 mm. The wedge-shaped region 12 projects outwardly by about twice that amount of 10 mm beyond the cross section of the respective fuel assemblies. The angle between two regions 12 located on opposite sides of a respective shell 3, and thus together forming an inlet funnel, is preferably more than 30°.

The respective free edges 15 of the marginal portions 11 facing one another from adjacent shells 3 are connected one to the other by a welded seam 17. The welded seam 17 is formed in a protective gas in the case of a material that is primarily of interest for the shells 3, namely austenitic steel (VA). However, it is also possible to select resistance welding somewhat in the form of butt welding.

With the welding seams 17, a mechanically strong structure is produced which is nevertheless capable of equalizing varying thermal expansions, without any formation of excessive stresses or warping. The permissible elongations or expansions depend upon the dimension of the projection or overhang of the bent marginal portions 11.

It can be readily seen in FIG. 2 that the welded-together marginal portions 11, with the regions 13 thereof, form plane surfaces wherein holes 18 are provided. These holes 18 serve for centering fuel assembly-transporting devices. When loading or unloading the rack, the transporting device, such as a telescoping gripper or grapple, for example, with centering pins or mandrels that are pointed, can therefore be anchored in the holes 18 in such a manner that the fuel assembly can be introduced into the interior space of the respective shell 3 or be withdrawn therefrom without applying excessively large lateral forces.

There is shown in the illustrated embodiment that in the intermediate space 20 between two adjacent shells 3, plates or sheets 21 of a water-resistant, neutron-absorbing material, especially of boron steel, are fastened to the individual shells 3, so that the arrangement or array of fuel assemblies in the rack 1 cannot become critical even if the reactivity is relatively high. The sheets or plates 21 have a thickness of 5 mm in the illustrated embodiment. Since the space 20 in the embodiment has a width of 20 mm there remains, between the sheets 21, a gap 22 which is 10 mm wide.

The gap 22, like all of the remaining free space in the space 20, is filled with light water which is provided as coolant for the storage of fuel assemblies. The coolant can enter into the space 20 through non-illustrated openings formed in the base plate 2, flow through this space 20 from the bottom to the top thereof, and thereafter flow out at the top through suitable outlets, especially through the cutouts 10 visible in FIG. 1 in the region of the corners 9 of the shells 3. An advantageous coolant flow is thereby produced. The cooling water simultaneously serves as moderator. It quickly decelerates neutrons to a thermal velocity which is favorable for absorption.

There is claimed:

1. Storage rack for elongated nuclear reactor-fuel assemblies having a polygonal cross section comprising an array of elongated sheetmetal shells of corresponding polygonal cross section for receiving respective fuel assemblies therein at locations of the rack at which the fuel assemblies are to be positioned, said shells being spaced from one another and neutron-absorbing material of given thickness being disposed in the space therebetween, an inlet funnel being formed of bent, upper marginal portions of the respective sheetmetal shells, mutually adjacent shells of said array having the bent, upper marginal portions thereof facing edgewise towards one another and, being directly connected to one another by a weld only at the respective edges of said marginal portions, said space between said shells being greater than said given thickness of said neutron-absorbing material and being bridged at said weld connection, for the most part, by sheetmetal extending transversely to the longitudinal direction of said shells, and means defining openings at corners of the polygonal cross sections of said shells and communicating with said spaces between said shell for providing passage therethrough of medium for cooling the fuel assemblies.

2. Storage rack according to claim 1 wherein said bent upper marginal portions of said sheetmetal shells are, respectively, formed with a wedge-shaped section and a section bent substantially perpendicularly to the longitudinal axis of the respective shell.

3. Storage rack according to claim 2 wherein said section bent substantially perpendicularly is formed with holes.

4. Storage rack according to claim 1 wherein said bent upper marginal portions of said sheetmetal shells has a length in direction of the polygonal cross section which is shorter than the length of said edge thereof.

* * * * *